July 24, 1956  R. E. WHITE  2,756,347
HIGH ENERGY RADIATION METER
Filed May 19, 1952
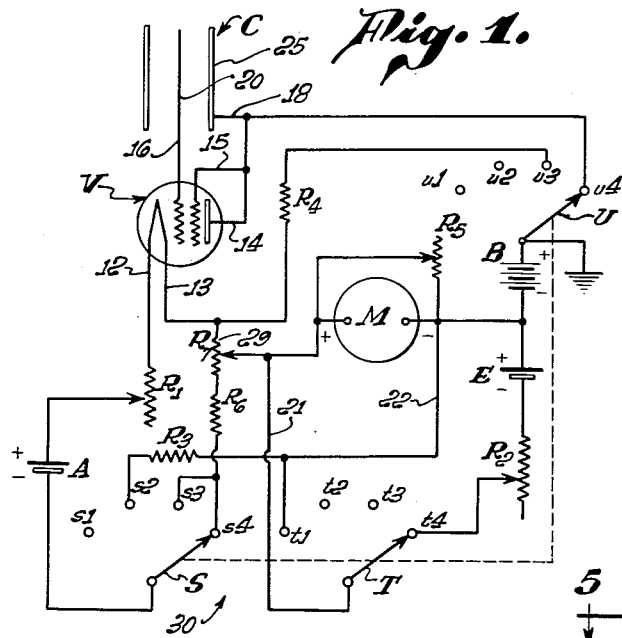
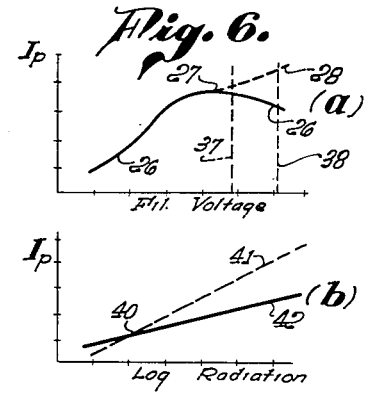
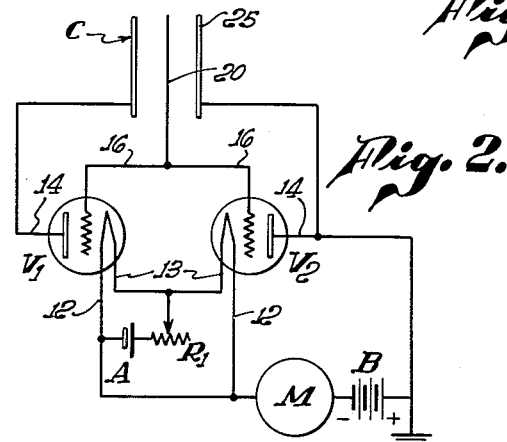
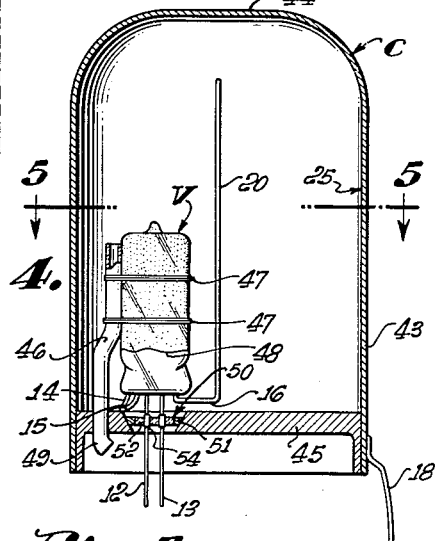
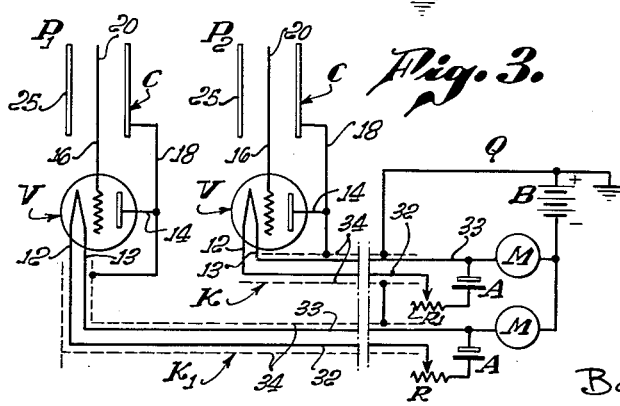
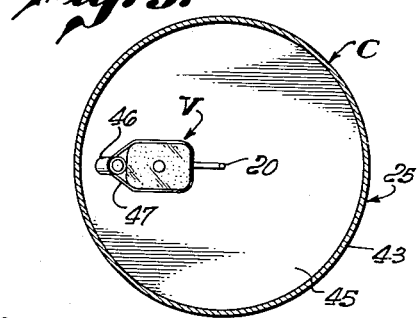
RALPH E. WHITE,
INVENTOR.
BY Barkelew & Scantlebury
ATTORNEYS.

United States Patent Office 2,756,347
Patented July 24, 1956

2,756,347

HIGH ENERGY RADIATION METER

Ralph E. White, Altadena, Calif., assignor, by mesne assignments, to Panellit Inc., a corporation of Illinois Application May 19, 1952, Serial No. 288,686

13 Claims. (Cl. 250—83.6)

This invention relates to the detection and measurement of radiation that is capable of producing ionization of matter in its path. Such radiation includes, for example, high energy electromagnetic radiation, such as gamma rays and high energy X-rays, and high velocity charged particles, such as electrons.

A primary purpose of the present invention is to provide a relatively simple, reliable and inexpensive device for the indication of such high energy radiation. The invention utilizes an ionization chamber as a primary radiation responsive means, and provides novel electrical means of indicating the intensity of ionization in the chamber.

Previously available devices for the indication of ionizing radiations of low intensity have required relatively complex circuits employing several vacuum tubes to provide sufficient sensitivity and stability. Ordinarily such devices have been powered by relatively high direct current voltages, requiring for portability either batteries of special and expensive types or means for stepping up the voltage of ordinary batteries. Moreover, such devices, if sufficiently sensitive to indicate slight departures from normal background radiation, were incapable of handling the far greater ionization currents that may result from serious radioactive contamination. It has been considered impossible to construct a stable single-tube device, operating at low voltage and indicating the entire range of intensity that may be encountered in actual practice.

Among the outstanding advantages of a radiation meter in accordance with the invention is the possibility of providing on a single instrument scale an indication of the radiation intensity over a remarkably wide intensity range. That range may typically embrace intensities from as little as 0.05 milli-roentgens per hour, or less than normal background radiation, to more than 1000 roentgens per hour, a range of more than a million fold. That wide range of response is of great practical value, particularly for civil defense and for warning devices, since it permits a single instrument to detect a slight increase from normal background radiation and to measure with considerable accuracy degrees of contamination that would be lethal in a few minutes.

In preferred form of the invention, the intensity response of the instrument may be closely logarithmic, permitting satisfactory representation at various different sensitivities on a single scale. For example, by providing a shunt that changes the sensitivity of the device by a factor of 1000, the same logarithmic scale may be utilized to read either in milli-roentgens per hour or in roentgens per hour.

Furthermore, the above advantages may be obtained with the use of only a single vacuum tube, greatly simplifying construction and maintenance of the instrument as compared with previously available radiation meters.

A serious problem in previous instruments for portable use has been the provision of satisfactory power supply, particularly for the plurality of vacuum tubes that were required to give adequate sensitivity and stability. Not only does the use of a single vacuum tube simplify that problem, but the present invention includes the possibility of operating that single tube at a remarkably low plate voltage. It is convenient in practice, and may be required by specification, to provide all power requirements from standard 1½ volt dry cells, such as are readily available for use in flash lights. A preferred embodiment of the invention can operate stably for many hours on the power provided directly by only a few, typically three to six, 1½ volt dry cells, such as standard commercial flash light batteries. No vibrator or other means of stepping up the battery voltage is required.

An important aspect of the invention is the direct connection of the negative electrode of the ionization chamber solely to the grid of a vacuum tube. No grid leak is explicitly provided, and the leakage resistance between the connected electrode-grid unit and the cathode is made so high, by suitable precautions in design and assembly, that the leakage across that resistance is extremely small. The common potential of the connected electrode and grid is allowed at all times to be determined directly by the balance between the positive ion current collected by the electrode in the ionization chamber and the negative current collected by the grid in the vacuum tube. For any given intensity of ionization, determined directly by the intensity and nature of the incident radiation, there is a corresponding equilibrium value of the grid bias at which the net electron current to the grid just equals the positive ion current collected by the electrode. That equilibrium grid bias is characteristic of the existing radiation intensity, and the grid tends to bias itself asymptotically to that value. As the grid bias varies in the described relation to the intensity of ionization, the plate current of the vacuum tube varies correspondingly. The plate current is utilized, either directly or after amplification, as a measure of the intensity of the ion-producing radiation.

It has been found that under suitable conditions of the described system, the plate current of the vacuum tube is very closely proportional to the logarithm of the intensity of the ionizing radiation, that logarithmic relation being typically maintained over the entire intensity range from normal background radiation to intensities that are highly lethal.

That highly desirable logarithmic response appears to result from the interplay of several distinguishable effects, each of which, taken by itself, might be expected to cause a non-linear, but not a logarithmic, overall response. For example, if the plate current is indicated by a device having a resistance that is low compared to the plate resistance of the tube, as is preferred, and if no load resistance is provided in the plate circuit other than the current indicator and its associated circuitry, the plate current may be expected to be a non-linear function of the grid potential. Moreover, the space current to the grid is ordinarily a non-linear function of the grid bias; and the grid potential may therefore be expected to be a non-linear function of the ionization current picked up by the negative electrode, since that current, in equilibrium of the present system, just balances the grid current. And, particularly at the relatively high gas pressure and the relatively low voltage that are preferably utilized in the ionization chamber, that chamber may not be fully saturated, so that the current actually reaching the collector electrode does not correspond quantitatively to all the positive ions produced by the radiation. The ratio of actual to potential ionization current then depends somewhat on the intensity of ionization, producing a non-linear relation between the collected current and the actual radiation. Thus, at least three distinguishable sources of non-linearity may be expected to be involved. And yet, as the cumulative effect of all those factors, and of whatever other factors may play a significant role, it is now possible to produce an overall logarithmic response over a very wide intensity range.

A particularly advantageous feature of the preferred circuit of the invention is that the negative, rather than the positive, electrode of the ionization chamber is connected to the tube grid. With that arrangement, positive ions reach the grid-connected electrode in increasing numbers as the radiation intensity increases, lowering the negative bias of the grid. The tube is used under such conditions that the effective grid-cathode resistance of the tube decreases with decreasing grid bias. Hence the described connection has the effect of relatively reducing the grid resistance at higher radiation intensities and relatively raising that resistance at lower intensities. This has the advantage that the time of response of the system to a change in radiation intensity is shorter at high than at low intensities. The time $t$ required for the connected grid and electrode to come within $1/e$ of the equilibrium potential that corresponds to a new ionization current may be expressed $t=RC$, where $C$ is the electric capacitance of the grid and electrode unit, typically about 4 micromicrofarads, and $R$ is the effective resistance between that unit and the cathode. In practice it is found for a typical system in accordance with the invention that, for very low rates of ionization, such as are associated with typical background radiation of the order of a tenth of a milli-roentgen per hour, the grid-cathode resistance of a typical preferred tube of electrometer type is about $10^{13}$ ohms, giving a response time of about 40 seconds. Such a relatively slow response time is to be expected in measuring currents of the order of $10^{-13}$ or $10^{-14}$ amperes. However, at larger ionization currents, the tube grid resistance automatically decreases, reducing the response time. For example, at radiation intensities of several roentgens per hour the response time is typically a small fraction of a second, and at still higher intensities the speed of indication is limited in practice only by the current indicating means employed.

A further important advantage in allowing the grid to seek its own bias in accordance with the instant radiation intensity, is that no battery is required for providing the grid bias voltage. In full effect, the thermal energy of electrons emitted from the heated cathode is utilized to provide the grid bias voltage. At low levels of ionization the equilibrium grid potential obtained in that manner may be typically from one to several volts negative with respect to the cathode. Energy for maintaining that negative grid potential is provided, in accordance with this aspect of the invention, indirectly from the normal power supply for the cathode heater, completely eliminating any special grid bias battery.

A further feature of the invention is the dual utilization of the same source of direct current to provide plate potential for the vacuum tube and to polarize the ionization chamber. In preferred form of the invention, the walls of the ionization chamber are connected directly to the tube plate, the collector electrode of the chamber being connected, as already indicated, directly to the tube grid. A further advantage of the described circuit is that the ionization chamber receives not only substantially the full voltage of the tube plate supply, but in addition the self-generated grid bias voltage. With a moderate voltage, for example three to six volts, applied between cathode and plate, the voltage across the ionization chamber is the sum of that plate voltage and the grid bias. That sum may typically be as much as thirty to fifty per cent greater than the applied plate voltage. Thus, to a significant extent, the polarizing voltage for the ionization chamber is self-generated by action of the vacuum tube, the remainder being supplied, either in whole or in part, by the regular plate power supply. Thus the invention may dispense entirely with special batteries or other specific power source for the ionization chamber.

The preferred circuit of the invention is particularly well adapted for arrangements that require relatively wide separation between the radiation responsive element of the system and the indicating means, whether the latter be a simple meter, a recording device, a radio transmitter, or other apparatus, which may include further amplification. For example, in an installation requiring a large number of radiation detection stations, it is usually convenient to locate at one main station all indicating means and all power sources, reducing to a minimum the equipment required at each detection station. In accordance with the present invention, each detection station may typically be provided with one ionization chamber and one vacuum tube. At the main station may be located, for example, indicating devices corresponding to the respective detection stations, individual power sources for the cathode heaters of all tubes, and a common power source for the plate circuits of all tubes and for polarizing all ionization chambers. All necessary connections between such a main station and the several detection stations can be provided in remarkably simple and economical manner. For example, only three mutually insulated leads may be required for each detection station, two leads for the cathode and cathode heater, and one lead for the plate and the positive electrode of the ionization chamber. By further placing the plate lead at ground potential, complete connections for each station may conveniently consist of a single shielded cable containing two insulated conductors. Not only does the provision of all connections by such a relatively simple cable result in great economy and reliability, but the system is remarkably free from induction effects, since, because of the relatively low resistance in the plate circuit, all leads in the cable have relatively low impedance to ground.

In accordance with a further aspect of the invention, the first stage vacuum tube (which may be the only tube of the system) is preferably mounted wholly within the ionization chamber. That structural arrangement has the advantage of surrounding the vacuum tube and its electrical connections by a uniform atmosphere, the character of which is readily controllable. Moreover, the collector electrode may then be, and preferably is, mounted directly upon the grid lead of the vacuum tube, completely avoiding all insulation problems. That arrangement completely eliminates both the usual insulated supporting structure for the electrode and the insulated connection from the electrode through the wall of the ionization chamber to the tube grid. The magnitude of the leakage resistance to the connected grid and electrode is then limited only by the structure of the tube itself. By suitable precautions, the surface leakage over the glass of the tube may be kept very small, and it is rendered unusually stable by control of the atmosphere surrounding the tube. Many of the advantages of placing the first stage vacuum tube wholly within the pressurized ionization chamber are obtainable whether or not the system embodies other aspects of the present invention.

A further aspect of the invention is the utilization of a plurality of vacuum tubes connected in parallel as to their plate circuits and having their grids connected together in floating relation to the remainder of the circuit. It is common practice in electronic systems for amplifying a voltage signal to supply the voltage signal to the grids of two or more tubes in parallel, taking as output the combined currents in the parallel-connected plate circuits of the tubes. In systems of that type, the output current bears substantially the same functional relation to the voltage signal, regardless of the number of tubes employed, the only result of multiplying the number of tubes being to multiply the output current by the same factor. However, in the present system the initial signal is not a voltage, but is the ionization current collected by the negative electrode of the ionization chamber. If, in such a system, a plurality of tubes are connected in parallel, the signal current is shared among the grids of all the tubes. Therefore the signal current to each grid is smaller, and the plate current of each tube is correspondingly smaller, than for a single tube receiving the entire input signal. The operating point and the output of each tube is changed by the presence of the other tube (or tubes). Nor is that change readily predictable for systems of the present type, since there is a non-linear relation between the magnitude of the signal current and the corresponding equilibrium grid bias. The functional relation between the signal current and the resulting potential of the electrode-grid unit is quite distinct from any corresponding relation in a conventional circuit, for example in a circuit in which a signal current leaks off across a grid leak resistor of definite resistance. In a system of the present type, the relation between the ionization current and the grid potential is non-linear, and is determined directly by the relation between the grid potential and the space current to the grid. Hence it might be expected that the functional relation between input and total output would be entirely different for a multiple tube system of the present type and for a single tube system. Moreover, since the output of each tube is reduced by presence of other parallel-connected tubes, it is by no means self-evident whether the overall output of a multiple tube system will be larger or smaller than that of a single tube.

Nevertheless, it had been discovered that under suitable conditions a plurality of parallel-connected tubes may be definitely advantageous in systems of the present type utilizing an input current signal to a floating control grid. When the grids of such a plurality of tubes are connected, for example, to the negative electrode of an ionization chamber, the combined plate current of the tubes bears a distinctive relation to the ionization current. As compared to a single tube stage, such a multiple-tube stage has been found to produce a smaller current output at low ionization currents, but has a higher current amplification, so that at higher levels of ionization the current output is increased. Moreover, it has been found that, if the circuit constants are such as to yield a logarithmic response with a single tube, the multiple-tube circuit also yields a response of logarithmic form. If the output current is plotted against the logarithm of the ionization current, the straight-line curve representing the multiple-tube circuit has a steeper slope than that for the single tube circuit, and the curves cross at a point that is typically within the usable range of the systems.

In preferred form, the invention utilizes a vacuum tube of electrometer type, that is, a tube designed particularly to provide low grid current and high grid-cathode resistance. The tube is preferably of sub-miniature type. If it has multiple grids it is preferably, although not necessarily, connected as a triode. The plate circuit voltage is preferably not more than about eight volts, and may be as low as one or two volts. At such values, production of positive ions within the vacuum tube is substantially eliminated, and even at relatively high negative grid bias the space current picked up by the grid consists primarily of electrons. Under that condition the response of the system is substantially different from that encountered when the positive ion current to the grid is comparable with, or greater than, the electron current. In accordance with the present invention, the electron current to the grid is substantially the entire grid current, and evidently varies always inversely with the grid bias, approaching zero asymptotically with increasing negative grid bias and increasing relatively rapidly as the grid bias approaches zero. That relation permits the system to operate continuously over the entire range of usable grid bias, from values corresponding to vanishingly small grid current (of the order of $10^{-14}$ amps.) to values corresponding to grid currents a million times greater. That enormously wide range of operation would be impossible without substantially complete elimination of positive ions in the vacuum tube. At relatively high values of negative grid bias, a flow of positive ions to the grid that would be completely negligible in conventional circuits could well exceed the electron grid current, and so throw the present system, with its floating grid, entirely out of balance. Hence it is only when combined with a relatively low plate voltage that the described circuit is stable and operative over the extremely wide range that has been described.

A further aspect of the present invention has to do with means for stabilizing the output of the system against variations caused by changes in voltage of the power supplies. It has been discovered that when a vacuum tube is used in a circuit of the described type, with the grid floating at a potential that is determined by a balance between the internal grid current and a variable input or signal current supplied to the grid, it is possible to operate the cathode heater at such a voltage that small changes of heater voltage produce substantially no change in plate current. Whereas, in a conventional amplifier circuit, the plate current ordinarily increases continuously and indefinitely with cathode temperature, the only limit being such practical considerations as life of the cathode, in the circuit of the present invention there is a range of cathode temperature for which the plate current is substantially independent of small changes in that temperature. Moreover, the value of heater voltage required to produce that relation is not particularly critical, and does not depend sharply upon the value of the signal current to the grid. By adjusting the heater voltage to the described value, it is possible to render the plate current substantially independent of variations in filament voltage that might otherwise cause serious errors. It has been found that, for tubes of the type described, the value of the heater voltage for which the plate current has a substantially stationary value (which may be an actual maximum or point of inflection) is between about $2/3$ and about $4/5$ of the rated heated voltage of the tube, and is typically about $3/4$ of the rated value. That remarkable relation is of the greatest practical importance, particularly in a system deriving filament power from batteries of relatively limited capacity.

At the low values of plate voltage that are preferred, the plate current typically varies rapidly with plate voltage. That does not necessarily lead to difficulty, since the drain on the plate power supply may be remarkably small. At an average plate current drain of 10 to 20 micro-amperes, standard flash light batteries will provide as much at 400 hours of continuous operation without serious voltage change. However, relatively large voltage variations in the plate power supply may be compensated by a novel type of circuit. That circuit utilizes a voltage divider in the cathode heater circuit, by which a definite fraction, preferably adjustable, of the heater supply voltage is introduced into the tube plate circuit. In preferred form, that voltage is of opposite polarity to the regular plate power supply. By adjustment of the fraction so introduced, the plate voltage actually applied to the tube can be conveniently adjusted to compensate for any abnormal departure of the plate power supply from its correct voltage. Furthermore, particularly when batteries of predetermined respective capacities are used to supply the plate and heater power, the normal drift of heater voltage has the effect of compensating, at least in large part, the normal drift of plate voltage. By suitable selection of the fraction of the heater voltage supply introduced in opposition to the plate voltage, the relatively slight percentage decrease in voltage normally appearing in the plate power supply may be automatically compensated by the relatively large percentage decrease that normally appears during the same period of operation in the voltage of the heater power supply. Whereas that type of compensation is not necessarily strictly accurate (particularly when the described voltage fraction is also adjustable for the purpose described), it has the great practical advantage of extending by an appreciable factor the length of time that a typical battery powered system can operate with satisfactory accuracy and without requiring any adjustment. That highly useful result is obtained by means of a new principle of operation, by which normal aging of one power supply is made to compensate normal aging of another power supply.

The ionization chamber is preferably filled with a readily ionizable gas, for example argon, in which recombination of ions is relatively slow. A gas pressure of several atmospheres is preferred, both to provide an increased ion current at given radiation intensity, and because the combination of such an elevated gas pressure and the described electrical circuit is found to give the advantageous logarithmic response curve already discussed. In filling the ionization chamber, the gas is carefully dried. The chamber is preferably evacuated and heated to drive off moisture, and is flushed with dried gas before being finally filled and sealed off. That is particularly important in that preferred form of the invention in which the first stage amplifying tube is placed wholly within the pressurized ionization chamber. The carefully dried gas then serves the valuable additional functions of minimizing and stabilizing the leakage from the grid conductor across the exterior surfaces of the tube.

A clear understanding of the invention and of its several objects and advantages will be had from the following description of certain illustrative systems in which it may be embodied. However, many variations may be made in the detailed structure of such systems. The particular embodiments selected for description, and the accompanying drawings, which form a part of that description, are intended only as illustration and not as a limitation upon the scope of the invention, which is defined in the appended claims.

In the drawings:

Fig. 1 is a schematic circuit diagram of an illustrative embodiment of the invention;

Fig. 2 is a schematic circuit diagram of another embodiment of the invention, utilizing a plurality of first stage vacuum tubes;

Fig. 3 is a schematic circuit diagram of another embodiment of the invention that includes a plurality of detection stations;

Fig. 4 is an axial section of an ionization chamber and vacuum tube unit in accordance with the invention;

Fig. 5 is a section on line 5—5 of Fig. 4; and

Fig. 6 is a diagram illustrating typical dependence of tube output upon filament voltage and upon radiation intensity for systems in accordance with the invention.

As shown in Fig. 1, a vacuum tube is represented at V with plate, cathode, control grid, and screen grid. When the tube has more than one grid, the connections are preferably such as to give triode operation, as indicated illustratively by the connection of the screen grid of tube V via its lead 15 to the plate. The cathode, as illustrated, is of filament type, with two filament leads 12 and 13. If the tube has a heater type cathode, the cathode lead may be connected to the negative lead of the heater. As an example, tube V may be a subminiature electrometer tube of the tube currently manufactured and sold by Raytheon Manufacturing Co. under the name CK 571.

An ionization chamber is shown schematically at C, with polarized electrodes 20 and 25. One of the electrodes is preferably the conductive wall of the chamber, as indicated at 25, and the other a central electrode of relatively small surface area, as indicated at 20. One of the electrodes, shown as 20, is connected directly to the control grid of tube V via grid lead 16, and is electrically isolated from all other circuits of the system.

Control switch 30 is shown illustratively in Fig. 1 as a ganged triple bank, four pole switch. The first switch arm S engages selectively the terminals $s1$, $s2$, $s3$, and $s4$, the second switch arm T shifting simultaneously to the corresponding terminal $t1$, $t2$, $t3$, or $t4$ and the third switch arm U shifting to the corresponding one of the terminals $u1$, $u2$, $u3$ and $u4$. In the fourth position of the switch, as illustrated, the system is in operating condition, which will be described first. The filament heater circuit then includes in series filament lead 12, the variable resistance R1, the battery A, switch arm S and terminal $s4$, resistance R6, the winding of potentiometer R7, and filament lead 13. Adjustment of R1 determines the voltage applied across the filament, which is preferably set to such a value, ordinarily between about ⅔ and about ⅘ of the rated filament voltage of tube V, as will give the plate current substantially a stationary value with respect to the cathode temperature.

Typical dependence of plate current $I_p$ upon filament voltage for a tube with floating grid in accordance with the invention is shown schematically in Fig. 6a. The solid line 26 represents one type of dependence, in which the plate current passes through an actual maximum, indicated at 27. The dashed curve 28 represents another type of dependence, in which the plate current follows curve 26 at lower values of filament voltage, passes through a substantially stationary value at 27, and then continues to rise with increasing filament voltage. The stationary value 27 of the plate current, in either instance, typically occurs at a filament voltage between about ⅔ and about ¾ of the rated or normal filament voltage of the tube, typically represented in Fig. 6a at 38. To take full advantage of that stationary value, the tube may be normally operated in accordance with the invention at a filament voltage, indicated typically at 37, which is slightly greater than that corresponding to the point 27, so that as the voltage of battery A declines, the filament voltage will pass through that point.

The plate circuit of Fig. 1 typically includes plate lead 14, switch terminal $u4$ and arm U, the plate battery B, a current responsive device represented as the meter M, that portion 29 of the winding of the potentiometer R7 between its sliding contact and the terminal connected to filament lead 13, which portion is common to the plate and the filament circuits, and filament lead 13. The positive terminal of battery B is preferably at ground potential, as indicated, so that electrode 25 of the ionization chamber will be grounded during operation of the system.

The present phase of the invention, in its broader aspects, may employ any suitable circuit means (of which potentiometer R7, connected as shown in Fig. 1, may be considered representative) by which a resistance, preferably variable, is common to both the filament and the plate circuits. If the value of the common resistance is variable, it is preferred that that variation should not alter the total resistance of the filament circuit. That condition is met, for example, by the circuit of Fig. 1. It is further preferred that in operation of the system common resistance 29 be separated from the negative terminal of battery A, as by resistance R6, and be immediately adjacent the negative end of the tube filament. The positive end of the filament may be separated from the positive terminal of battery A, as by resistance R1.

The effective plate voltage actually applied between the plate and the negative end of the filament (neglecting, for clarity of explanation, effects due to the flow of plate current) is then the algebraic sum of the voltage of battery B and the voltage drop in the common resistance 29 caused by current flow in the filament circuit. As illustrated, that voltage drop is in opposition to the voltage of battery B, and is therefore subtracted from the latter voltage to give the effective voltage of the plate circuit. Regardless of the polarity of the voltage drop in the common resistance, variation of its magnitude may be employed as a convenient means for adjusting the effective plate voltage, for example to compensate abnormal variations in the voltage of battery B. For example, if the voltage drop is in opposition to battery B, as illustrated, a decrease in the voltage of battery B may be compensated by decreasing the magnitude of common resistance 29.

An advantage of the illustrated polarity relation, is that the circuit may act automatically to compensate the normal decline in voltage of battery B. The voltage drop in common resistance 29 may be expressed as the total voltage delivered by battery A multiplied by the ratio of the common resistance 29 to the sum of the resistances of R1, R6, R7 and the tube filament. The value of that resistance ratio varies, for example, with the setting of potentiometer R7. For maximum stability of the plate current, the system is so designed that the normal value of that ratio (e. g., with fresh batteries at A and B) is substantially equal to the ratio of the normal absolute rate of decline of the voltage of B to the normal absolute rate of decline of the voltage of A. Those normal rates of decline will depend upon such factors as the relative capacities of batteries A and B and the relative currents they are called upon to deliver; and can readily be determined for any particular system. For example, if battery A is found to decline 0.1 volt in 48 hours of continuous operation, and battery B declines 0.015 volt during the same period, the system may be so designed that the resistance ratio already defined has a value of about 0.15. Then, after 48 hrs. of service, the effective plate voltage is unchanged, since the decline of 0.015 in the voltage delivered by battery B is just compensated by the decline in the oppositely directed voltage drop across resistance 29, given by the product of the resistance ratio 0.15 by the decline of 0.1 volt in the voltage delivered by batter A.

The load resistance in the plate circuit, which consists substantially entirely of the resistance of meter M, is preferably relatively low, for example one to two thousand ohms. Meter M may be any device that is responsive to current. It may represent, for example, a series resistance and additional stages of amplification responsive to the voltage drop across that resistance. For many types of service, meter M is preferably a conventional microammeter, and may have a full scale sensitivity, for example, of 25 to 50 microamps. Any known means may be provided for shifting or adjusting the sensitivity of current sensitive meter M. As an example, a variable resistor R5 is shown, connected in shunt across meter M.

Ionization chamber C is polarized with electrode 20 (which is connected to the control grid) negative and electrode 25 positive. Power for maintaining that polarization may be obtained in whole or in part from the plate circuit power supply, shown as battery B. As illustrated in Fig. 1, electrode 25 is tied directly to the tube plate via line 18. Alternatively, electrode 25 may be maintained at a lower potential than the tube plate, as by connection of line 18 to an intermediate terminal of battery B; or at a more positive potential, as by insertion of an additional battery in line 18.

In the circuit of Fig. 1, with control switch 30 in its fourth or operating position, a bucking current is sent from the battery E through meter M in a direction opposite to that of the normal plate current. That bucking current circuit includes in series battery E, meter M, line 21, switch arm T and terminal t4, and the resistance R2, which may be variable, as shown. By suitable selection or adjustment of R2, the bucking current may be made to compensate any desired amount of the plate current through meter M, so that the meter will respond only to the excess of the plate current over that amount. Since bucking battery E acts only directly upon meter M and does not appreciably affect tube V, its voltage is less critical than that of the other batteries in the system. For many purposes the circuit of the invention, as illustratively shown in Fig. 1, may be simplified, as by omission of the bucking circuit or of the switch 30 with its test circuits to be described.

The first position of switch 30 is "off" position for the system. The filament circuit is then open at s1 and meter M is shorted via line 21, switch arm T and terminal t1 and line 22. The plate circuit is open at u4, and the bucking circuit is open at t4.

In second position of switch 30, filament battery A is connected via switch arm S and terminal s2 in series with resistance R3, line 22, meter M, the upper part of R7, the tube filament and resistance R1. In that circuit the resistance of R3 may be so predetermined with respect to the sensitivity of meter M that, when the voltage of battery A is correct, meter M indicates a definite predetermined current, which may, for example, be identified by a suitable scale mark. The relation of the actual current indication to that scale mark provides a measure of the actual voltage of battery A.

In third position of switch 30, the filament circuit is closed as for operation at switch terminal s3, and plate battery B is connected in a series circuit including switch arm U and terminal u3, resistance R4 and the upper part of R7. Resistance R4 may be of such value that when the voltage of battery B has its correct value and R7 is set in normal position the current through meter M has a definite value, preferably the same value already mentioned in connection with the second switch position. The meter reading will then provide a check on the voltage of battery B. If the voltage thus indicated is incorrect, it may be brought to its correct value by suitable adjustment of R7. For example, movement of the contact of R7 upward in Fig. 1 reduces the value of the voltage tapped from the filament circuit into the plate circuit in opposition to plate battery B; and thus increases the current through meter M in third position of switch 30, and increases in the same ratio the plate voltage actually applied to tube V in fourth position of switch 30. It will be seen that the filament circuit is closed during such testing of the plate voltage, and carries its normal operating current. Hence the voltage drop in R7 due to filament current has the same value during adjustment of R7 with switch 30 in third position and during normal operation of the system with switch 30 in fourth position.

Figs. 2 and 3 represent modifications, shown for clarity of illustration in simplified form. A control switch and means for testing and compensating battery voltages may be provided in those embodiments if desired, for example as indicated in Fig. 1; and any other desired modifications known to the art may be introduced in any of the embodiments illustratively shown. In Fig. 2, two vacuum tubes V1 and V2, preferably of the same type, are connected in parallel. The filaments of the two tubes are connected in parallel across battery A and resistance R1; their plates are connected together and to the positive terminal of battery B, and also, as shown, to the positive electrode 25 of ionization chamber C. The negative electrode 20 of chamber C is connected directly and solely to the control grids of the two tubes via the grid leads 16. The meter M is connected between the negative terminal of battery B and the connected negative leads of the filaments. A plurality of tubes greater than two may be employed in parallel connection in the manner shown illustratively for two tubes in Fig. 2.

Fig. 6b represents schematically the distinctive relation that has been found to exist between the output of such a multiple tube system (dashed line 41) and that of a single tube system (solid line 42). In sharp contrast to the known use of parallel-connected multiple tubes in conventional circuits for amplifying voltage signals, in the present type of system the output from the multiple tubes is not always greater than the output of the single tube. For values of the ionization current less than a definite value (corresponding to point 40 of Fig. 6b) the output is actually reduced by adding tubes. However, it has been found that if the single tube system gives a logarithmic response (represented by the straight line 42), the multiple tube system also gives a logarithmic response; and the response of the multiple tube system represents a greater current amplification. Accordingly, a multiple tube system of the type described provides increased output at radiation intensities greater than some definite value; and that value has been found to lie near the lower end of the intensity range that is encountered in actual practice, as indicated schematically by the point 40 in the diagram.

Fig. 3 represents a further modification in accordance with the invention, in which a plurality of detection stations are connected to the same main station Q. Each detection station, of which two are shown illustratively at P1 and P2, comprises an ionization chamber C and an associated vacuum tube V. Main station Q comprises preferably a common source of direct current power B for the plate circuits of the vacuum tubes V of all detection stations; and the individual current sensitive indicating means M for the respective detection stations. Individual power sources A are provided for the respective cathode heaters of vacuum tubes V, shown illustratively as of filament type. Variable resistances R1 may be provided in each heater circuit, as illustrated. The power sources A and resistances R1 may have any suitable location, but preferably are at main station Q, and are connected to the respective tube filaments by means of cables shown schematically at K1 and K2.

In preferred form, each of cables K1 and K2 comprises two insulated conductors 32 and 33 surrounded by a conductive shield, represented schematically by dashed lines at 34. Conductors 32 and 33 of each cable are connected at the detection station to cathode heater leads 12 and 13, respectively. At the main station one of the conductors, shown as 33, is connected to the negative terminal of a power source A and to one side of a meter M. The other conductor, shown as 32, is connected via R1 to the positive terminal of the power source A, completing the cathode heater circuit. The other side of the meter M is connected, as by the common bus 36, to the negative terminal of common plate power source B. The plate circuits of the respective vacuum tubes are preferably completed via the conductive shields 32 of the respective cables, preferably at ground potential. As illustrated, those shields are all connected at main station Q to the positive terminal of common power source B; and are connected at the respective detection stations to the plate leads 14 of the respective tubes. The ionization chambers C at the several detection station P1 and P2 are preferably polarized by connection of one electrode 25 via line 18 to the associated tube plate, and of the other electrode 20 directly and solely to the associated tube control grid, via grid lead 16.

The described multiple station system has the great advantage that all power and signal connections may be provided between main station Q and each detection staton P by means of a single shielded cable containing only two insulated conductors. Moreover, those conductors are electrically separated from the shield by relatively low impedances, so that they are relatively free from induction effects produced, for example, by stray electromagnetic fields. In the particular embodiment shown, the impedance between cable conductors 32, 33 and cable shield 34 is substantially the resistance of the associated meter M, which may be typically of the order of one or two thousand ohms.

Figs. 4 and 5 illustrate a preferred manner of construction of a typical ionization chamber and vacuum tube assembly, such as may be employed in any of the described circuits. As shown, ionization chamber C comprises a cylindrical shell 43, with a generally hemispheric closure 44 at one end and a flat base 45 closing the other end. A filling tube 46 extends through a bore in the base, and provides also a support for vacuum tube V, which may be secured to the tube within chamber C by hoops 47 of soft wire. The upper part of the envelope of tube V, as shown in Fig. 4, is painted with an electrically conductive material, indicated at 48, which is electrically connected via hoops 47 and tube support 46 to the shell 43 of the ionization chamber. The lower portion of the envelope of tube V, adjacent the electrical leads that are sealed into the tube, is protected during assembly from any contamination that might lower the normally very high leakage resistance across the glass, particularly that to control grid lead 16. That lead is bent upward, as illustrated, and, if long enough, may form directly chamber electrode 20, which preferably extends approximately coaxially in spaced relation substantially the entire length of shell 43. Electrode 20, whether comprising the original tube lead itself or an extension secured as by solder to the tube lead, preferably does not touch any other part of the chamber structure, but is supported exclusively by tube control grid lead 16.

The plate lead 14 of the tube and lead 15 of the screen grid (in tubes having such a second grid) are electrically connected to the chamber wall, as by soldering to base plate 45. Cathode heater leads 12 and 13 are brought out through the wall of the ionization chamber in insulated and hermetically seated relation. For example, a prefabricated feed-through seal assembly 50 may be employed, typically comprising a metal ring 51, adapted to be soldered in a bore in base 45, and a glass wafer 52 sealed to ring 51 and pierced by two small metal tubes 54, sealed to the glass, through which leads 12 and 13 may be threaded and sealed, as by solder.

Tube 46 is open at its inner end, and is initially open also at its outer end. After the interior of chamber C has been evacuated, flushed and filled with the desired gas or gas mixture to the desired pressure, tube 46 is sealed off outside of chamber C, as by a cold weld, indicated at 49. It is preferred to fill ionization chamber C to a pressure of from about five to about ten atmospheres with argon, carefully dried. Pressures of argon within that range have been found, in combination with the electrical system described herein, to yield the substantially logarithmic response that has been described. Moreover, pressures in that range have the advantage of giving a relatively high ionization current, but without requiring special wall structure or threatening serious damage from failure of the wall.

I claim:

1. A system responsive to high energy radiation, said system being effective throughout a wide range of radiation intensity and comprising a vacuum tube of electrometer type having a cathode, a plate and a control grid, an electric circuit connected externally of the tube between the cathode and the plate and including electric power means for rendering the plate positive with respect to the cathode by a voltage that is less than about 8 volts and is insufficient to produce an appreciable number of positive ions within the tube, structure forming an ionization chamber adapted to contain an ionizable gas and including electrically conductive and mutually insulated positive and negative electrodes, the negative electrode being electrically isolated from said plate circuit and being connected directly to the control grid of the tube to form an electrical element at a floating potential, the value of that potential being determined continuously and substantially exclusively by the equilibrium balance between the positive space current to the electrode and the negative space current to the grid, the resulting equilibrium grid bias acting to produce a current in the plate circuit that varies substantially logarithmically with the intensity of high energy radiation in the ionization chamber, and means responsive to the magnitude of said current in the plate circuit.

2. A system responsive to high energy radiation, said system being effective throughout a wide range of radiaation intensity and comprising a vacuum tube of electrometer type having a cathode, a plate and a control grid, an electric circuit connected externally of the tube between the cathode and the plate and including electric power means for rendering the plate positive with respect to the cathode by a voltage that is less than about 8 volts and is insufficient to produce an appreciable number of positive ions within the tube, the total resistance of said plate circuit externally of the tube being a small fraction of the internal plate resistance of the tube, structure forming an ionization chamber adapted to contain an ionizable gas and including electrically conductive and mutually insulated positive and negative electrodes, the negative electrode being electrically isolated from said plate circuit and being connected directly to the control grid of the tube to form an electrical element at a floating potential, the value of that potential being determined continuously and substantially exclusively by the equilibrium balance between the positive space current to the electrode and the negative space current to the grid, the resulting equilibrium grid bias acting to produce a current in the plate circuit that varies substantially logarithmically with the intensity of high energy radiation in the ionization chamber, and means responsive to the magnitude of said current in the plate circuit.

3. A system responsive to high energy radiation, said system being effective throughout a wide range of radiation intensity and comprising a vacuum tube of electrometer type having a cathode, a plate and a control grid, an electric circuit connected externally of the tube between the cathode and the plate and including electric power means for rendering the plate positive with respect to the cathode, structure forming an ionization chamber adapted to contain an ionizable gas and including electrically conductive and mutually insulated positive and negative electrodes, the negative electrode being electrically isolated from said plate circuit and being connected directly to the control grid of the tube to form an electrical element at a floating potential, the value of that potential being determined continuously and substantially exclusively by the equilibrium balance between the positive space current to the electrode and the negative space current to the grid, the resulting equilibrium grid bias acting to produce a current in the plate circuit that varies substantially logarithmically with the intensity of high energy radiation in the ionization chamber, the plate circuit including a direct current meter having a scale and an indicating element movable over the scale in response to current, the movement of the indicating element being directly proportional to the magnitude of the current and the scale being calibrated logarithmically.

4. A system responsive to high energy radiation, said system being effective throughout a wide range of radiation intensity and comprising a vacuum tube of electrometer type having a cathode, a plate and a control grid, an electric circuit connected externally of the tube between the cathode and the plate and including electric power means for rendering the plate positive with respect to the cathode by a voltage that is less than about 8 volts and is insufficient to produce an appreciable number of positive ions within the tube, said plate circuit also including a direct current meter, the load resistance of the plate circuit consisting primarily of the resistance of the meter and being a small fraction of the plate resistance of the tube, and structure forming an ionization chamber adapted to contain an ionizable gas and including electrically conductive and mutually insulated positive and negative electrodes, the negative electrode being electrically isolated from said plate circuit and being connected directly to the control grid of the tube to form an electrical element at a floating potential, the value of that potential being determined continuously and substantially exclusively by the equilibrium balance between the positive space current to the electrode and the negative space current to the grid, the resulting equilibrium grid bias acting to produce a current in the plate circuit that varies substantially logarithmically with the intensity of high energy radiation in the ionization chamber.

5. A system as defined in claim 1 and in which the tube cathode is of filament type and is adapted to be heated for normal operation by application thereto of a normal filament voltage, and the system includes a filament circuit connected across the filament and comprising a direct current power source delivering power at a predetermined voltage and a resistance connected in series with the last said power source and of such magnitude that the voltage applied to the filament has a value between about ⅔ and about ⅘ of the said normal filament voltage, at which value the tube plate current is substantially stationary with respect to the filament voltage.

6. A system responsive to high energy radiation, comprising a vacuum tube having a tube housing with a cathode of filament type, a plate and a control grid within the housing, and with respective external electrical leads for the filament, the plate and the control grid, structure forming an ionization chamber adapted to contain an ionizable gas under super-atmospheric pressure, the said structure including an electrically conductive chamber wall, means supporting the vacuum tube within the ionization chamber, an ion-collecting electrode mounted on, and supported exclusively by, the grid lead of the tube in spaced relation to the chamber wall, the said mounting of the electrode forming an electrical connection between the electrode and the grid, the plate lead of the tube being directly connected to the inner face of the chamber wall, respective electrical connections between the two filament leads of the tube and the exterior of the ionization chamber, the said filament connections passing in mutually insulated and hermetically sealed relation through the chamber wall, means for providing electrical power to the said filament connections to heat the cathode, and circuit means connected between at least one of the said filament connections and the wall of the ionization chamber, said circuit means including a source of direct current power and acting to maintain the chamber wall and the tube plate at the same positive potential with respect to the tube cathode, and means external of the ionization chamber responsive to the magnitude of the current in the said circuit means.

7. A system responsive to high energy radiation, comprising a radiation responsive unit, a radiation indicating unit spaced from the radiation responsive unit, and electrical conductive means extending between the two units; the radiation responsive unit comprising a vacuum tube having a cathode, a cathode heater electrically connected to the cathode, a plate and a control grid, structure forming an ionization chamber adapted to contain an ionizable gas and including electrically conductive and mutually insulated positive and negative electrodes, the negative electrode being electrically isolated from the tube plate and from the tube cathode and being connected directly and solely to the tube control grid; the electrical conductive means consisting solely of three mutually insulated conductors, two of said conductors being connected to the cathode heater and the third conductor being connected to the tube plate and to the positive electrode; and the radiation indicating unit comprising a source of electric power for the cathode heater, a source of plate power for the tube, and means responsive to electric current, the source of cathode heater power being connected between the said two conductors, and the source of plate power and the current responsive means being connected in series between the third conductor and one of the said two conductors, the connected negative electrode and control grid forming an electrical element at a floating potential, the value of which is effectively determined continuously and solely by the equilibrium balance between the positive space current to the electrode and the negative space current to the grid.

8. A system as defined in claim 7 and in which the said third conductor comprises a conductive shield surrounding the said two conductors and connected to ground.

9. A system for indicating high energy radiation, said system comprising a plurality of mutually spaced detection stations and a main station; each detection station comprising an ionization chamber having its positive electrode substantially at ground potential, a vacuum tube having its plate substantially at ground potential and its control grid electrically isolated from the tube plate and from the tube cathode and connected directly to the negative electrode of the ionization chamber; the main station comprising a common source of direct current power for the plate circuits of the said vacuum tubes having positive and negative terminals, the positive terminal of the power source being substantially at ground potential, and a plurality of current responsive devices connected between the negative terminal of the power source and the respective cathodes of the vacuum tubes; the connections between the respective cathodes and the associated current responsive devices comprising insulated conductors surrounded by conductive shielding, the said shielding being substantially at ground potential and providing electrical connections between the positive terminal of the power source and the respective tube plates and positive chamber electrodes, the connected negative electrode and control grid forming an electrical element at a floating potential, the value of which is effectively determined continuously and solely by the equilibrium balance between the positive space current to the electrode and the negative space current to the grid.

10. A system as defined in claim 9 and in which the main station includes also individual sources of power for the heaters of the respective tube cathodes, the connections between the cathode heaters and their respective power sources including the said insulated conductors.

11. A system responsive to high energy radiation, comprising structure forming an ionization chamber adapted to contain an ionizable gas, the said structure including electrically conductive and mutually insulated positive and negative electrodes, a plurality of vacuum tubes of electrometer type, having respective cathodes, plates and control grids connected in parallel, an electric circuit connected between the cathodes and the plates of the tubes for rendering the plates positive with respect to the cathodes, the negative electrode of the ionization chamber being electrically isolated from the said circuit and being connected directly to the control grids of the several tubes, the connected negative electrode and control grids forming an electrical element at a floating potential, the value of which is effectively determined continuously and solely by the equilibrium balance between the positive space current to the electrode and the sum of the negative space currents to the several grids, and means responsive to the magnitude of the current in the said circuit.

12. The method of operating an electrical system of the type that includes a vacuum tube of electrometer type having an electrically heated cathode, the tube control grid being electrically isolated from the plate circuit; said method comprising supplying to the control grid a positive signal current of definite magnitude to maintain the grid at the potential at which the space current to the grid is equal in magnitude and opposite in direction to the said signal current and operating the cathode heater at a heater voltage which has a value between about ⅔ and about ⅘ of the normal operating heater voltage, at which value the tube plate current is substantially stationary with respect to the heater voltage.

13. In an electrical system of the type that includes a vacuum tube of filament type, a plate circuit including a plate battery, and a filament circuit including a filament battery, operation of the system causing the voltages delivered by the plate battery and by the filament battery to decline at respective normal rates of decline; voltage compensating means comprising a resistance having one terminal directly connected to the negative side of the filament and forming a part of the filament circuit and also forming a part of the plate circuit, whereby a voltage proportional to the filament current is inserted into the plate circuit in opposition to the voltage of the plate battery, the ratio of the said resistance to the total resistance in the filament circuit being substantially equal to the ratio of the normal rate of decline of the plate battery to the normal rate of decline of the filament battery.

References Cited in the file of this patent

UNITED STATES PATENTS

| | | |
|---|---|---|
| 2,544,928 | Lahmeyer et al. | Mar. 13, 1951 |
| 2,574,000 | Victoreen | Nov. 6, 1951 |
| 2,598,215 | Borowski et al. | May 27, 1952 |
| 2,606,296 | Simpson | Aug. 5, 1952 |
| 2,609,511 | Wright | Sept. 2, 1952 |
| 2,615,063 | Brown | Oct. 21, 1952 |
| 2,617,044 | Neher | Nov. 2, 1952 |